Sept. 29, 1936.    A. E. STACEY, JR., ET AL    2,055,988
METHOD AND APPARATUS FOR CONTROLLING ATMOSPHERIC
CONDITIONS WITHIN AN ENCLOSURE
Filed July 8, 1933    4 Sheets-Sheet 2
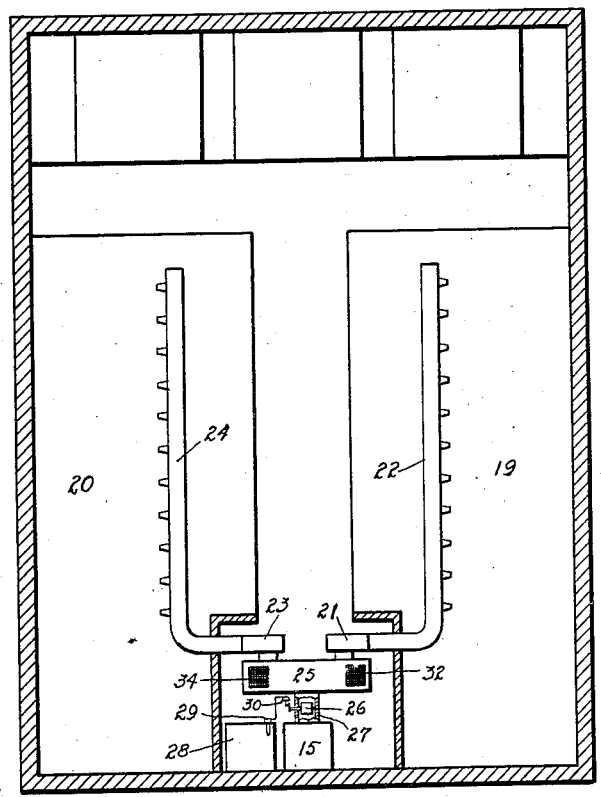
Fig-2-
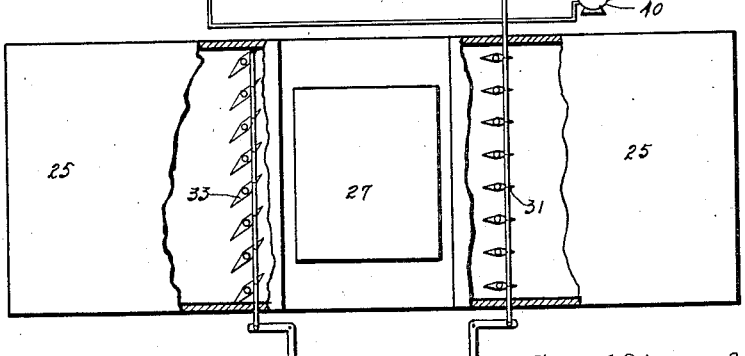
Fig-3-
INVENTOR.
Samuel E. Lyman & Alfred E. Stacey, Jr.
BY
ATTORNEYS.

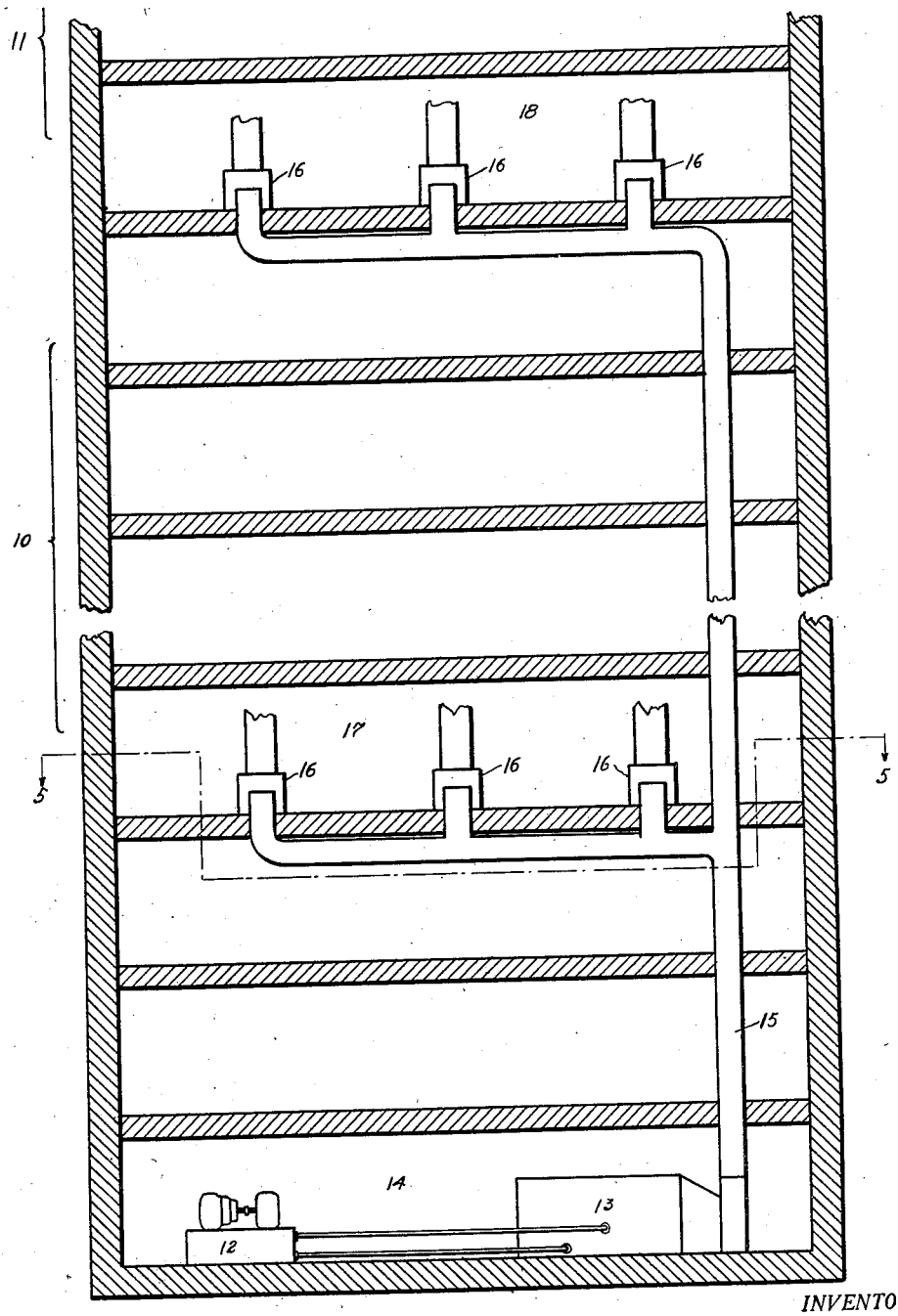
Fig-1-

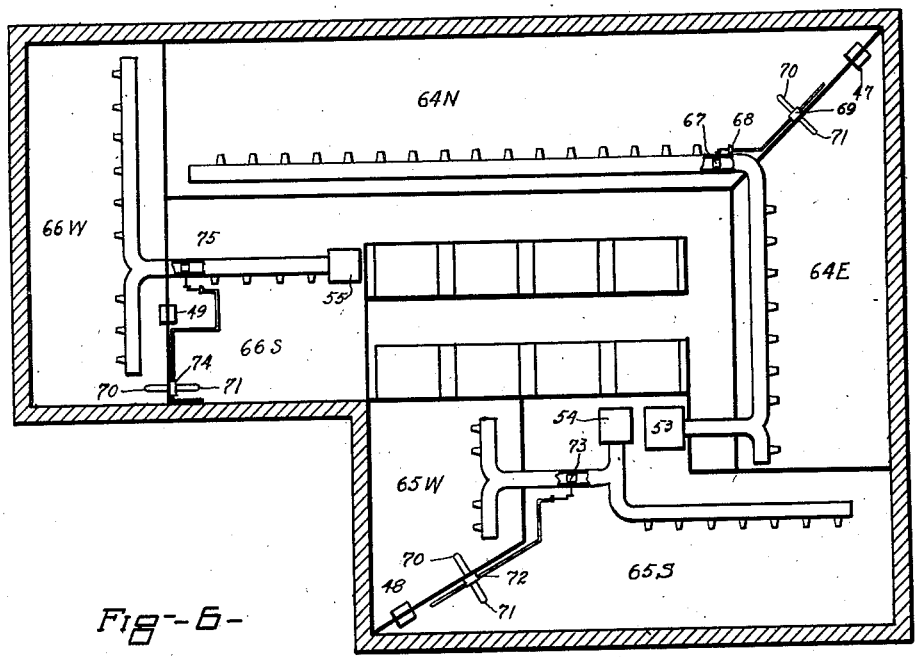
Fig-6-
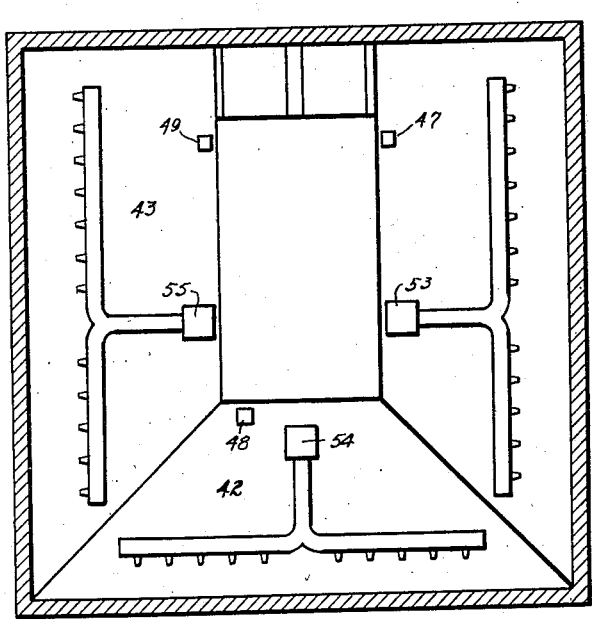
Fig-4-
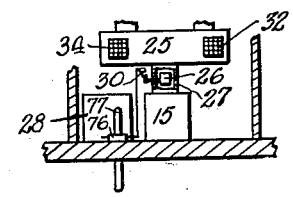
Fig-7-
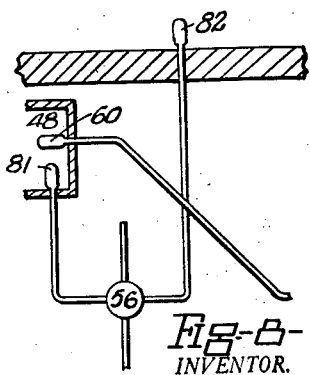
Fig-8-
INVENTOR.
Samuel C Lyman & Alfred E. Stacey, Jr.
BY
ATTORNEYS.

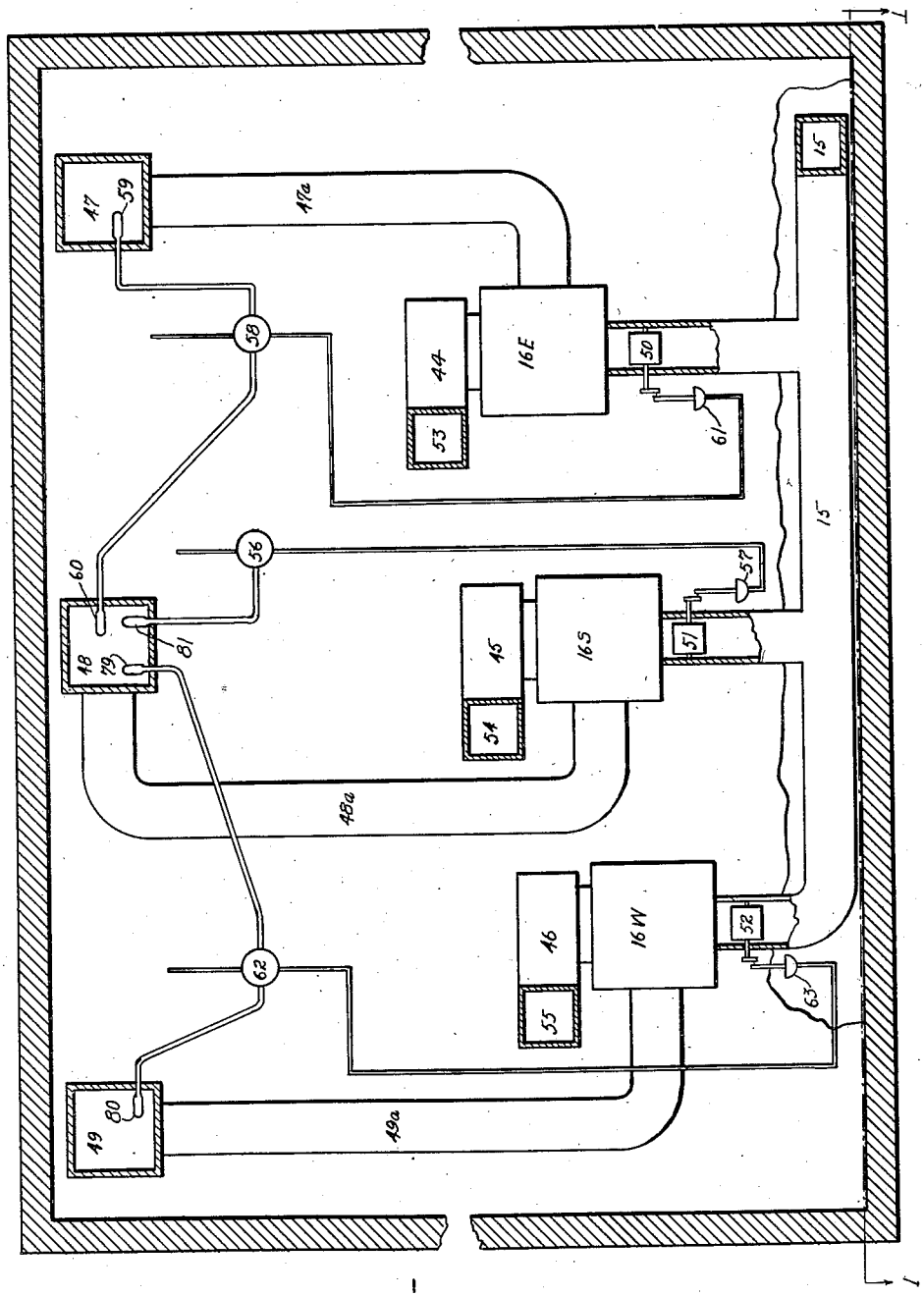

Patented Sept. 29, 1936

2,055,988

UNITED STATES PATENT OFFICE 2,055,988

METHOD AND APPARATUS FOR CONTROLLING ATMOSPHERIC CONDITIONS WITHIN AN ENCLOSURE

Alfred E. Stacey, Jr., Essex Fells, and Samuel E. Lyman, Elizabeth, N. J., assignors, by mesne assignments, to Carrier Engineering Corporation, Newark, N. J., a corporation of New York Application July 8, 1933, Serial No. 679,588

18 Claims. (Cl. 236—1)

This invention relates to methods of controlling atmospheric conditions within an enclosure, and more particularly, to methods for use with enclosures in which the heat load due to sunlight gain, radiation, and the like, forms a major portion of the total heat load.

The application of air conditioning, that is, the control of temperature, humidity and the distribution of air within enclosures, to practical usage has followed a gradual line of development through three general stages. Each successive phase involved new and more complex problems.

In its infancy, the art was utilized only for industrial work. There followed a general application to theatres and auditoriums for the comfort of patrons, and later, the application to a few isolated rooms. In each of these applications, certain heat load factors, namely, sun effect, could be discounted to a great extent.

Only recently has the general public begun to demand an application of this source of comfort to its offices, hotels and homes. Here the problem becomes vastly complex, because not only is the heat load due to people, lights and motors, constantly varying, but the portion of the load due to sun effects reaches its maximum importance. The problem is further complicated by the division of one enclosure into a number of rooms. By way of illustration, an air conditioning system capable of maintaining a fixed degree of comfort in rooms on the east side of the building during the morning, overcools rooms on the south and west sides. Similarly, in the afternoon, the east and south sides are too cool. If the system is designed for an average condition, then no part of the enclosure is exactly comfortable. Not only is this a source of constant complaint, but if one section is constantly overcooled, it follows that the cost of operation is unnecessarily high. Further, the temperature in all parts of the enclosure should be varied in accordance with variation in outside temperature conditions. For example, if the outside temperature is 80° F., an inside temperature of 74° is very comfortable, but if the temperature rises to 90° F., 74° is uncomfortably cool. Further, the shock occasioned by going from a too cool inside to a too warm outside, or vice versa, frequently results in head colds and the like.

It is, therefore, an object of this invention to provide a system of atmospheric control which includes the division of the enclosure into a number of zones, corresponding to different relative positions of the sun, and the control of atmospheric conditions in individual zones.

Another object of the invention is to control the temperature within one zone, called a master zone, in accordance with changes in atmospheric conditions outside of the enclosure, and to vary the temperature in all zones from this master zone.

Still another object of the invention is to maintain all zones at substantially the same temperature.

A further object of the invention is to provide a control system which will shift the cooling effect necessary to overcome sun effect, from one zone to another in accordance with movements of the earth with respect to the sun.

It is another object of the invention to reduce the refrigeration requirements of the system to a minimum, by supplying to each zone of a zoned enclosure just sufficient conditioned air to maintain desired atmospheric conditions therein.

Other objects, and various features of the invention will be more apparent from the description to be read in conjunction with the accompanying drawings, in which:

Fig. 1 is an elevation, taken on line 1—1 of Fig. 5, of a building illustrating the division of a building into control sections;

Fig. 2 is a floor plan, in section, of a building particularly adapted to a two zone air distributing system;

Fig. 3 is a fragmentary view of the zone control apparatus of Fig. 2;

Fig. 4 is a floor plan, in section, divided into three air distributing zones;

Fig. 5 is a plan view, taken on line 5—5 of Fig. 1, showing the air supply and control apparatus for Figs. 4 and 6, Fig. 6 is a view, in section, of a typical floor plan adaptable to subdivision into six zones, Fig. 7 is a fragmentary view illustrating an alternative control arrangement to be used in conjunction with the system of Fig. 2; and Fig. 8 is a fragmentary view illustrating an alternative control arrangement to be used in conjunction with the system of Fig. 5.

In an office building, floor space is valuable, and every inch must be carefully conserved. In practicing their invention, applicants contemplate dividing the building into a number of sections, each section comprising several floors in vertical extension. A part of one floor of each section is utilized to house certain air conditioning apparatus. Thus, applicants are enabled to divide their air supply and control equipment, the bulkier portions being located in a basement, or in a service area, while the other apparatus is located within the various sections. In this manner, less valuable space is used for equipment, smaller conduits may be used, and, in many respects, a more flexible system is provided. Further, some portions of a building are usually shaded by surrounding buildings. Obviously, such shaded portions will not be subject to the same heat load as unshaded portions, other factors being equal. Therefore, it may be desirable to divide the building into sections corresponding to the shaded and unshaded portions. For example, Fig. 1 shows a building divided into two sections, 10 and 11. The main air conditioning apparatus, comprising a refrigerating machine 12 and a dehumidifier 13, is located in the basement 14. Conditioned air is conveyed from 13 through riser 15 to a first group of mixing boxes 16 located on the apparatus floor 17 of zone 10, and to a second group of mixing boxes 16 on floor 18 of section 11. The distribution of air from the mixing boxes to the points of usage will be hereinafter explained. While Fig. 1 shows only two sections, and one main conditioning apparatus, this view is intended to be illustrative only, as applicants also contemplate dividing a building into a plurality of sections, and utilizing several main air conditioners.

The second phase of the invention relates to the zoning of individual sections. For example, Fig. 2 shows a typical floor of a building which is particularly adaptable to a two zone arrangement. In this type building, the northern exposure is devoted to elevator service, and does not, therefore, require conditioning. The southern exposure of the conditioned area is relatively small and hence, does not require separate treatment. The main sun exposures are on the east and west sides. Hence, the building is divided into an eastern zone 19 and a western zone 20. During the morning hours, the sun effect will be greatest on zone 19 (east), and proportionately less on zone 20; and during the afternoon, the sun effects will be exactly reversed. To counteract this variable heat load, applicants provide a method in which the zone which is subject to the greatest heat load always receives the greatest proportion of conditioned air. To this end, each section is provided with an individual fan for each zone, to wit, fan 21 supplying distributing conduit 22 for zone 19, and a fan 23 supplying a distributing conduit 24 for zone 20. Similarly, each section is provided with a mixing box 25 from which fans 21 and 23 may draw air. Mixing box 25 is supplied with conditioned air from conditioner 13 through riser 15, under the control of damper 26 in duct 27. Damper 26 responds to variations in temperature in the return air riser 28, which riser is adapted to return air from the various floors to the conditioner 13. If the temperature of the return air rises, indicating an average increase in temperature in the building, thermostat 29 operates damper motor 30 to increase the amount of conditioned air supplied to mixing box 25. Each fan is adapted to draw a portion of conditioned air from 25, and a portion of unconditioned air (return air from zones 19—20), and to mix these portions to give a total volume at a desired temperature. Thus, as illustrated in Figs. 2 and 3, fan 21 will draw a portion of conditioned air from 25 under the control of dampers 31. The remainder of the fan's capacity will be return air drawn through grille 32. Similarly, fan 23 draws air from the mixing box under control of damper 33, and untreated air through grille 34. Thus, the temperatures of the air supplied to zones 19 and 20 depend upon the position of dampers 31 and 33, and, therefore, these dampers should be controlled by the temperatures in the respective zones. To this end, applicants utilize a differential thermostat 35 which may be of any desired type. In practice, applicants prefer to use an instrument in which one thermo-responsive element 36 controls the movement of a compressed air valve head, while the other, responsive element 37 controls the movement of the valve seat. In operation, expansion of element 36 tends to open the valve, while expansion of the element 37 tends to close it. For example, see Fig. 1 of U. S. Patent No. 2,021,727, issued November 19, 1935, which shows such an instrument. In Fig. 3, element 36 responds to the temperature prevailing in zone 19, as indicated by a sample of air in tube 38, while element 37 responds to the temperature in zone 20 as indicated by air in sampling tube 39.

Fig. 3 shows the position of dampers 31 and 33 during the hottest part of the morning. Dampers 31, controlling the temperature in zone 19, are held in a fully opened position, preferably against the tension of a spring, by air pressure on damper motor 40. As the temperature in zone 19 drops, element 36 contracts, thereby partially closing the compressed air valve and thus reducing the compressed air pressure on damper motor 40. As the pressure drops, dampers 31 close, and through a mechanical linkage 41, dampers 33 tend to open. Further, the temperature in zone 20 tends to rise as the afternoon sun begins to affect zone 20 (west). In response to this increased heat load, element 37 expands and, as was explained, tends to close the air valve. Thus, the pressure on motor 40 is further reduced. Consequently, dampers 33 tend further to open and to increase the conditioned air supplied to zone 20, while dampers 31 tend to close, thus reducing the air supply to zone 19.

By way of summarization, damper 26 admits to mixing box 25 just enough conditioned air to take care of the entire heat load in both zones, as indicated by the return air temperature. Dampers 31 and 33 are designed to shift from one zone to the other that quantity of conditioned air necessary to overcome the heat load due to sun effects. Differential thermostat 35 is designed to balance the air pressure on damper motor 40 to maintain a zero temperature differential between the zones, that is, to maintain both zones at the same temperature.

The system of Fig. 2, as so far explained, is designed to hold a constant temperature in both zones regardless of outside atmospheric conditions. Frequently, it is preferable to vary the inside temperature, within limits, in response to variations in outside temperature. In such event, thermostat 29 is replaced by a differential thermostat 76 of any well known type (shown in Fig. 7). The thermostat is preferably of the same general type as thermostat 35, and may, if desired, correspond exactly to Fig. 1 of U. S. Patent No. 2,021,727, issued November 19, 1935. One thermo-responsive element 77 (corresponding to element 36) is subjected to thermal changes in return air riser 28, while the other element 78 (corresponding to element 37 of thermostat 35) is subject to variations in outside atmospheric conditions. In operation, element 77 tends to increase air pressure on damper motor 30 in response to an increase in the return air temperature, and thus, to increase the amount of conditioned air supplied to mixing box 25. On the other hand, element 78 tends to reduce the air pressure on motor 30 in response to a rise in outside air temperature, and thus, to reduce the amount of conditioned air supplied to the mixing box. It is apparent, therefore, that element 77 tends to hold a constant temperature for any one setting of the instrument, and that element 78 is adapted to vary the setting of the instrument in response to changes in outside temperature. As a result, the inside temperature rises with a rise in outside temperature. The instrument may be designed to hold a constant difference between the inside and outside air temperatures, or, as is usually preferable, the instrument may be designed to give a variable difference, to wit, a two degree inside change for a three degree outside change.

Fig. 4 illustrates a typical building floor plan which is particularly adaptable to a three zone system. As can be seen, the eastern, southern and western exposures are relatively great, and are proportionately affected by the sun. Consequently, the floor is divided into an eastern zone 41, a southern zone 42, and a western zone 43.

Fig. 5 shows the apparatus designed to supply air to the distributing systems in the various zones of Fig. 4. In this arrangement, each zone is provided with a mixing box 16, i. e., 16E for zone 41, 16S for zone 42, and 16W for zone 43, and each mixing box is provided with a separate fan numbered 44, 45, and 46 respectively. Further, the zones are provided with individual conduits 47a, 48a and 49a (corresponding to return air riser 28 of Fig. 2) for returning air from the individual zone-sections to the conditioner 13. Conduits 47a, 48a, and 49a supply return air to the various mixing boxes 16 for reheating purposes, as will be hereinafter described. Conduit 15 supplies conditioned air to the boxes 16 under the control of dampers 50, 51, and 52.

Briefly, the mode of operation is as follows: Fans 44, 45, and 46 draw a constant volume of air from their respective mixing boxes 16W, 16S, and 16E, and supply this air to the distributing systems of zones 41, 42, and 43 through conduits 53, 54 and 55. Dampers 50, 51, and 52 control the amount of conditioned air supplied to the mixing boxes in accordance with the heat loads in the respective zones. The remainder of the fan capacity is drawn from return ducts 47, 48, and 49, through conduits 47a, 48a, and 49a. The return air mixes with the conditioned air to give a mixture at the desired temperature, and sufficient, in volume, for air distribution purposes.

In a three zone system, applicants contemplate controlling the temperature in the zone having the most stable heat load, termed the master zone, and controlling the temperatures in the other zones with respect to this master zone. In Fig. 5, for example, the position of damper 51 is determined by a thermostat 56 located in return air conduit 48. As the temperature in 48 tends to rise, thermostat 56 acts to increase the air pressure on damper motor 57, thereby opening the damper and admitting more conditioned air to mixing box 16S. Thus, the amount of conditioned air supplied to mixing box 16S depends upon the heat load in zone 42 as reflected by the temperature of air returned from that zone.

The position of damper 50, controlling the amount of conditioned air supplied to mixing box 16E, and hence, controlling the temperature in zone 41, is determined by a differential thermostat 58. Thermostat 58, while illustrated in a different manner, is of the same general type as differential thermostat 35 of Fig. 3. One thermostatic element 59, corresponding to element 36 of Fig. 3, responds to changes in temperature in zone 41 as reflected by the temperature of return air in conduit 47, while the other element 60, corresponding to element 37 of Fig. 3, responds to changes in temperature of return air in conduit 48. Damper 50 is held in open position, preferably against the tension of a spring, by air pressure on damper motor 61.

As the sun effects on zone 41 lessen, the heat load decreases and the temperature in conduit 47 tends to fall. In response to this change, element 59 tends to contract, thus reducing the compressed air pressure on damper motor 61. Consequently, damper 50 tends to close under the tension of its spring, and thereby to reduce the amount of conditioned air supplied to mixing box 16E.

As the sun effect on south zone 42 increases, the heat load increases and the temperature on conduit 48 tends to rise. Element 60, responsive to this change, expands, and tends further to reduce the pressure on motor 61. As a result, the conditioned air supplied to box 16E is still further reduced.

The west zone 43 is controlled in identically the same manner as zone 41. Thus, differential thermostat 62, corresponding to thermostat 58, controls the pressure on damper motor 63, consequently the position of damper 52, in response to variations in temperature in return conduits 48 and 49 affecting thermostatic elements 79 and 80 respectively.

With respect to thermostats 35, 58 and 62, it is of importance to note that these devices all work on a differential principle, i. e., the thermostats operate to maintain a constant difference in temperature. In the described application, the thermostatic ratio is 1 to 1, hence, the differential is zero. But, from the foregoing disclosure, it becomes apparent that where desired, these instruments may be designed to hold a constant difference in temperature of any desired number of degrees.

By way of summarization, the system of Figs. 4 and 5 is designed to shift that amount of conditioned air necessary to overcome sun effects from one zone to another as the relative positions of the sun and building change. During the morning, the sun is on the eastern, and partially on the southern zones. During the afternoon, the sun is on the southern and western zones. Thermostat 56 tends to maintain a constant temperature in zone 42. Differential thermostat 58 maintains the temperatures in zones 41 and 42 at the same point, consequently reducing the amount of conditioned air supplied to zone 41 as the heat load decreases. Similarly, differential thermostat 62 maintains the temperatures in zones 42 and 43 at the same point, and varies the amount of conditioned air in accordance with the heat load on these zones.

The system as so far described is adapted to maintain the temperature in the zones at a fixed point regardless of outdoor atmospheric conditions. However, it is frequently desirable to vary the inside conditions with respect to the changes in outside conditions. To this end, applicants contemplate using a differential thermostat corresponding to thermostat 76 of Fig. 7 to control the temperature in zone 42. In Fig. 8, thermostatic element 81, corresponding to element 77 of Fig. 7, is subject to the temperature in zone 42 as reflected by the return air temperature in conduit 48. This element, expanding in response to a rise in temperature, increases the air pressure on damper motor 57, and hence, tends to increase the conditioned air supplied to mixing box 16S. Element 82, corresponding to 78 of Fig. 7, is subject to the prevailing outside atmospheric conditions. An increase in outside temperature affecting this element tends to reduce the air pressure on motor 57, and hence, to cut down the air supply. The design and operation of the instrument to vary the temperature in zone 42 is identical with the operation of instrument 76 described in connection with Fig. 7. Since differential thermostats 58 and 62 are designed to control the temperatures in zones 41 and 43 in some desired relation to the temperature in zone 42, it is apparent that the temperatures of zones 41 and 43 will vary in accordance with variations in outside temperatures.

Fig. 6 illustrates a floor plan particularly adaptable to subdivision into six zones. Fundamentally, the floor is divided in three principal zones, to wit, a north-eastern, a southern, and a south-western. Each principal zone is divided into two sub-zones. Thus, the north-eastern zone comprises sub-zones 64N—64E; the southern zone 65S—65W, and the south-western zone 66S—66W.

Conditioned air for the three principal zones is supplied from an apparatus such as is shown in Fig. 4. The temperature controls may be identically as described in connection with Fig. 4. However, it is of note that conduits 47, 48, and 49 return air from both sub-zones of their respective principal zones. Therefore, thermostats 58, 56, and 62 control the temperature of conditioned air in response to changes in the total heat load on the principal zones.

The amount of air supplied to the principal zones is divided between the sub-zones in accordance with the requirements in the respective sub-zones.

To this end, applicants provide a damper 67 in the distributing system between sub-zones 64E and 64N. This damper is designed to vary the quantity of air supplied to the sub-zones by the amount necessary to absorb the heat due to sun effects. It is apparent, therefore, that damper 67 is never fully closed. Preferably, the damper is held in full open position against the tension of a spring by air pressure on damper motor 68. Thermostat 69 is adapted to vary the pressure of air on damper motor 68, and hence, to vary the position of damper 67. Thermostat 69, preferably of the same type as thermostats 35, 58 and 62, has one thermostatic element 70 (corresponding to element 36 of Fig. 3) responding to changes in temperature in sub-zone 64N, and another thermostatic element 71 (corresponding to 37 of Fig. 3) subject to the temperature variations in sub-zone 64E.

Expansion of element 70 increases the air pressure on damper motor 68, thus opening damper 67 to admit more conditioned air to sub-zone 64N. On the other hand, an expansion of element 71 decreases the pressure on motor 68, thereby tending to close damper 67. It is apparent, therefore, that the position of damper 67 is varied to proportion the air between sub-zones 64N and 64E, so that both sub-zones may be at the same temperature. Fundamentally, thermostat 69 acts to shift the proportions of conditioned air in accordance with the heat load on the respective zones, as was described hereinbefore.

In identically the same way, thermostat 72 varies the position of damper 73 to apportion conditioned air supplied by conduit 54, between sub-zones 65S and 65W. Likewise, thermostat 74 varies the position of damper 75 to properly proportion the conditioned air supply between sub-zones 66S and 66W.

In order to describe the invention in an orderly and understandable fashion, applicants have divided the invention into two distinct phases, to wit, the division of a building into sections, and the division of floors into zones. In practice, these two phases are combined. Thus, the building is divided into sections, and each section (hereinafter referred to as a zone-section) is divided into zones. One set of supply and control apparatus, such as is shown in Figs. 2, 3, and 5, may, therefore, be utilized to supply conditioned air to all floors of one section. For example, all of the floors of section 10 (Fig. 1) may be divided into identical zones 41, 42, and 43 (Fig. 4). Thus, 41, 42, and 43 become zone-sections. One set of mixing boxes 16E, 16S, and 16W may, therefore, be utilized to supply conditioned air to the respective zone-sections. Similarly, mixing boxes 25 may supply comparable zones 19—20 on all of the floors of one section. Of course, where the conditioned area constitutes only one floor, then a zone and a zone-section are identical. Obviously, in this case, conditioner 13 may take the place of air supply conduit 15.

While applicants have described and illustrated typical floor plans which are divisible into 2, 3, and 6 zones, it is intended that these divisions shall be taken as illustrative only. Further, applicants have described their invention with particular relation to varying sun effects, i. e., each typical floor has been divided into zones corresponding to different relative positions of the sun. The invention may, however, be used to take care of other variable heat load conditions. For example, a restaurant, or cafeteria, within a building, is subject to widely varying occupancy. One group of people may lunch at one time, and others at another. Here, applicants' invention may be used to shift from one zone to the restaurant, that amount of air necessary to overcome the heat caused by human occupancy. From the foregoing, it is evident that the principles of applicants' invention may be utilized to divide a floor into any desired number of zones, and the zoning may be made to take care of any varying heat load factor.

We claim:

1. The method of controlling atmospheric conditions within an enclosure which comprises dividing said enclosure into a plurality of zones, supplying a volume of conditioned air unmixed with other air sufficient to absorb the heat requirements of all zones, controlling the amount of conditioned air supplied in accordance with changes in the heat load within all of said zones, dividing said air supply between said zones, mixing the conditioned air with other air and shifting a portion of said air supply from one zone to another as the load conditions in said zones vary to maintain constant the temperature in all of said zones.

2. The method of controlling the temperature within an enclosure which comprises dividing said enclosure into a plurality of zones, supplying a volume of air sufficient to absorb the total heat requirements of said enclosure, varying the amount of air supplied in accordance with variations within the entire enclosure, dividing said supply between said zones, and controlling said division of air between said zones whereby the temperature in one of said zones will be regulated with respect to the temperature in another of said zones.

3. The method of controlling the temperature within an enclosure comprising dividing said enclosure into a plurality of zones, supplying a volume of air sufficient to absorb the heat load on all of said zones, varying the amount of air supplied in accordance with temperature changes outside of said enclosure and also in accordance with temperature changes within said enclosure, dividing said air supply between said zones, and shifting a portion of said air supply from one zone to another to maintain constant the temperature in all of said zones.

4. The method of controlling the temperature of an enclosure which comprises dividing said enclosure into a plurality of zones, controlling the temperature in one zone with respect to the heat load affecting said zone, and controlling the temperature in the other zones with respect to the heat load on said first zone and also, with respect to the heat load on said other zones.

5. The method of controlling the temperature of an enclosure which comprises dividing said enclosure into a plurality of zones, controlling the temperature of one of said zones as a master zone in accordance with temperature changes within the master zone, automatically varying the temperature in said master zone with respect to atmospheric conditions outside of said enclosure, and controlling the temperature in the other of said zones with respect to the temperature in said master zone.

6. The method of controlling the temperature of an enclosure which comprises dividing said enclosure into a plurality of zone sections, supplying a volume of conditioned air sufficient to absorb the total heat in all of said zone sections, controlling the supply of conditioned air to one of said sections as a master zone section in accordance with temperature changes within said master zone section, supplying air to the other zone sections, and varying the amount of air supplied to said other zone sections in accordance with the heat load affecting said master section and also in accordance with the heat load affecting said other sections.

7. The method of controlling the temperature within an enclosure which comprises dividing said enclosure into a plurality of principal zones, dividing said principal zones into a plurality of subzones, supplying to each of said principal zones a volume of conditioned air unmixed with other air sufficient to absorb the total heat load on said principal zone, dividing said volume of air supplied to a principal zone between the subzones thereof in proportion to the heat load on said subzones, and mixing the conditioned air with other air.

8. A combination of apparatus for controlling atmospheric conditions within a zoned enclosure including an air distributing system in each zone, a mixing box for each zone, each mixing box being proximate the zone served thereby, means for supplying a volume of conditioned air to each mixing box, means for supplying unconditioned air to each mixing box, a fan for delivering air from each mixing box to its associated distributing system, a thermostat responsive to the heat load on said enclosure for controlling the amount of conditioned air supplied to the several mixing boxes, and thermostatically operated means for proportioning said conditioned air between said mixing boxes in accordance with the heat load on said zones.

9. A combination of apparatus for controlling atmospheric conditions within a zoned enclosure including a plurality of mixing boxes for the zones of said enclosure, means for supplying conditioned air to said mixing boxes, means for supplying unconditioned air to said mixing boxes, fans for delivering air from said mixing boxes to said zones, a thermostat responsive to the heat load on the entire enclosure for controlling the amount of conditioned air supplied, and means operative responsive to a differential thermostat having one element thereof subject to temperature changes in one zone and another element thereof subject to temperature changes in another zone for proportioning the conditioned air between said mixing boxes.

10. A combination of apparatus for controlling atmospheric conditions within an enclosure including means for supplying a volume of conditioned air, means for regulating the volume of said air in accordance with the heat load on said enclosure, means for distributing said air within the separate zones of said enclosure, and means operative responsive to a differential thermostat having one element thereof subject to temperature changes in one zone and another element thereof subject to temperature changes in another zone for shifting a portion of said air supply from one zone to another in accordance with variations in heat load affecting said zones.

11. A combination of apparatus for controlling atmospheric conditions within a zoned enclosure including a mixing box for each zone of said enclosure, means for supplying conditioned air to said mixing boxes, means for supplying unconditioned air to said mixing boxes, means for delivering air from said mixing boxes to the zones of the enclosure, means for independently regulating the temperature of air supplied by one of said mixing boxes to one of said zones, and means for regulating the temperature of air supplied by the other mixing boxes to the other zones in accordance with temperature changes in the other zones and also in accordance with changes in temperature of air supplied by said first mentioned mixing box.

12. A combination of apparatus for controlling atmospheric conditions within a zoned enclosure including a plurality of mixing boxes, means for supplying conditioned air to said mixing boxes, means for supplying unconditioned air to said mixing boxes, means for delivering air from said boxes to the zones of said enclosure, means for regulating the temperature of air supplied to one of the zones in accordance with changes in heat load affecting said zone, means for varying the temperature of air supplied to the zone in accordance with changes in atmospheric conditions outside of said enclosure, means for regulating the temperature of air supplied to another of said zones in accordance with changes in heat load affecting said other zone, and means for varying the temperature of air supplied to said other zone in accordance with changes in heat load affecting said first mentioned zone.

13. The method for controlling atmospheric conditions within a zoned enclosure which comprises supplying conditioned air to a plurality of zones, controlling the temperature of air supplied to one of said zones in accordance with changes in temperature in that zone, varying the temperature of that zone in accordance with changes in atmospheric conditions outside of said enclosure, controlling the temperature of air supplied to another of said zones in accordance with changes in temperature therein, and varying the temperature of air supplied to said other zone in accordance with variations in temperature in said first mentioned zone.

14. A combination of apparatus for controlling atmospheric conditions within a zoned enclosure including a plurality of mixing boxes, means for supplying conditioned air to said mixing boxes, means for supplying unconditioned air to said mixing boxes, means for delivering air from said boxes to the zones of said enclosure, a differential thermostat having one element thereof responding to temperature changes within a master zone and another element thereof responding to temperature changes outside of said enclosure for controlling the temperature of air supplied to the master zone, and another differential thermostat having one element thereof responding to temperature changes within the master zone and another element thereof responding to temperature changes within another zone for controlling the temperature of air supplied to said other zone.

15. A method of conditioning an enclosure, consisting in dividing the enclosure into a plurality of zones, the load factor on each zone constituting a variable as opposed to a constant factor, supplying a volume of conditioned air to a central distributing point serving all of said zones, and apportioning said supply of conditioned air between said zones whereby the proportion of conditioned air delivered to a particular zone corresponds to the heat load of said zone as compared to the heat load of all the zones and mixing the conditioned air with other air subsequent to said apportionment.

16. A method of conditioning an enclosure consisting in dividing an enclosure into a plurality of sections, apportioning a volume of conditioned air between said sections, dividing each section into a plurality of zones, apportioning the conditioned air delivered to each section between the zones of said section, and changing the proportions of conditioned air delivered to the various zones of the section as the heat load on said zones varies and mixing the conditioned air with other air subsequent to said apportionment steps.

17. The method of controlling atmospheric conditions within a building which comprises dividing the building into a plurality of sections, dividing said sections into a plurality of zones, supplying separate volumes of conditioned air unmixed with other air to said sections in accordance with the total heat load on said sections, proportioning the volume of conditioned air supplied to each section between the zones of said section, in accordance with temperature conditions in said zones and mixing said conditioned air with other air.

18. The method of controlling the temperature of an enclosure which comprises dividing the enclosure into a plurality of zones, conditioning air at a point remote from the zones, supplying conditioned air unmixed with other air for said zones, varying the amount of conditioned air supplied in accordance with the heat load on all of said zones, dividing the conditioned air between the zones, varying the proportions of said division responsive to changes in atmospheric conditions in said zones, and mixing the conditioned air with other air proximate said zones.

ALFRED E. STACEY, Jr.
SAMUEL E. LYMAN.